(12) United States Patent
Schorr et al.

(10) Patent No.: US 7,348,982 B2
(45) Date of Patent: Mar. 25, 2008

(54) METHOD, SYSTEM, AND COMPUTER-READABLE MEDIUM FOR CREATING AND LAYING OUT A GRAPHIC WITHIN AN APPLICATION PROGRAM

(75) Inventors: Janet L. Schorr, Seattle, WA (US); Stephen T. Wells, Seattle, WA (US); Matthew Kotler, Kenmore, WA (US); Thomas C. Underhill, Seattle, WA (US); Scott A. Sherman, Seattle, WA (US); Ilan Berker, Seattle, WA (US)

(73) Assignee: Microsoft Corporation, Redmaon, WA (US)

( * ) Notice: Subject to any disclaimer, the term of this patent is extended or adjusted under 35 U.S.C. 154(b) by 110 days.

(21) Appl. No.: 10/955,271

(22) Filed: Sep. 30, 2004

(65) Prior Publication Data

US 2006/0066631 A1  Mar. 30, 2006

(51) Int. Cl.
*G06T 11/20* (2006.01)
(52) U.S. Cl. ...................................... 345/441
(58) Field of Classification Search ................. 345/441
See application file for complete search history.

(56) References Cited

U.S. PATENT DOCUMENTS

| | | | |
|---|---|---|---|
| 5,214,755 A | 5/1993 | Mason | 715/521 |
| 5,649,216 A | 7/1997 | Sieber | 715/506 |
| 5,818,447 A | 10/1998 | Wolf et al. | |
| 5,903,902 A | 5/1999 | Orr et al. | 707/517 |
| 5,909,220 A | 6/1999 | Sandow | |
| 5,956,737 A * | 9/1999 | King et al. | 715/517 |

(Continued)

FOREIGN PATENT DOCUMENTS

EP  1 111 543 A2  6/2001

(Continued)

OTHER PUBLICATIONS

U.S. Appl. No. 10/957,103, filed Sep. 30, 2004, entitled "Editing The Text of An Arbitrary Graphic Via A Hierarchical List." Inventors: Brent Gilbert; Cynthia C. Shelly; Gary A. Pritting; Kim Tapia St. Amant; Matthew J. Kotler; and Richard J. Wolf.

(Continued)

*Primary Examiner*—Ulka Chauhan
*Assistant Examiner*—Dan Washburn
(74) *Attorney, Agent, or Firm*—Merchant & Gould

(57) ABSTRACT

A method, apparatus, and computer-readable medium are provided for creating and laying out a graphic within a drawing application program. The method includes receiving a data model defining a set of data and data relationships to be represented in the graphic, receiving a graphic definition describing the mapping of the data from the data model to a set of algorithms, algorithm parameters, constraints, constraint rules, and shape properties, determining a shape size and position for the layout nodes utilizing the set of algorithms, constraints, and constraint rules from the graphic definition, and creating a list of shapes and shape properties for the graphic, including size and position. The method further includes determining if the graphic fits a given layout into a specific area based on the set of constraint values and if the graphic does not fit the specific area, then modifying the set of constraint values using the constraint rules.

33 Claims, 5 Drawing Sheets

U.S. PATENT DOCUMENTS

| | | | |
|---|---|---|---|
| 6,057,842 | A | 5/2000 | Knowlton et al. |
| 6,057,858 | A | 5/2000 | Desrosiers |
| 6,081,816 | A | 6/2000 | Agrawal ..................... 715/521 |
| 6,173,286 | B1 | 1/2001 | Guttman et al. ............ 707/100 |
| 6,189,132 | B1 | 2/2001 | Heng et al. .................. 716/11 |
| 6,204,859 | B1 | 3/2001 | Jouppi et al. |
| 6,405,225 | B1 | 6/2002 | Apfel et al. |
| 6,667,750 | B1 | 12/2003 | Halstead et al. ............ 715/788 |
| 6,826,727 | B1 * | 11/2004 | Mohr et al. ................. 715/517 |
| 6,944,830 | B2 * | 9/2005 | Card et al. .................. 715/853 |
| 7,055,095 | B1 * | 5/2006 | Anwar ........................ 715/523 |
| 7,107,525 | B2 | 9/2006 | Purvis ........................ 715/517 |
| 2001/0051962 | A1 | 12/2001 | Plotkin ....................... 707/522 |
| 2003/0079177 | A1 | 4/2003 | Brintzenhofe et al. |
| 2004/0111672 | A1 * | 6/2004 | Bowman et al. ............ 715/513 |
| 2004/0133854 | A1 * | 7/2004 | Black ......................... 715/517 |
| 2004/0205602 | A1 | 10/2004 | Croeni ....................... 715/517 |
| 2005/0157926 | A1 | 7/2005 | Moravec et al. |
| 2005/0273730 | A1 | 12/2005 | Card et al. .................. 345/440 |
| 2005/0289466 | A1 | 12/2005 | Chen |
| 2006/0064642 | A1 | 3/2006 | Iyer |
| 2006/0294460 | A1 | 12/2006 | Chao et al. ................. 715/520 |
| 2007/0055939 | A1 | 3/2007 | Furlong et al. |

FOREIGN PATENT DOCUMENTS

| | | |
|---|---|---|
| WO | WO 01/39019 A2 | 5/2001 |
| WO | WO 03/052582 A1 | 6/2003 |
| WO | WO 2004/046972 A1 | 6/2004 |

OTHER PUBLICATIONS

U.S. Appl. No. 11/081,324, filed Mar. 15, 2005, entitled "Method and Computer-Readable Medium for Fitting Text To Shapes Within A Graphic." Inventors: Ilan Berker; Jason C. Costa; Keywon Chung; Matthew J. Kotler; Janet L. Schorr; Scott A. Sherman; and Karen K. Wong.

U.S. Appl. No. 11/081,323, filed Mar. 15, 2005, entitled "Method and Computer-Readable Medium for Generating Graphics Having A Finite Number of Dynamically Sized and Positioned Shapes." Inventors: Ilan Berker; Matthew Kotler; Janet L. Schorr; Scott A. Sherman; Thomas C. Underhill; and Stephen T. Wells.

EP Search Report for EP 05 10 5366.8-2218, Jan. 2, 2006.

EP Search Report for EP 05 10 8636.1-2218, Jan. 2, 2006.

"Proquis Compliance Management & Document Control Solutions", http://www.proquis.com/allclear-text2chart.asp, 1 pg, Jul. 18, 2005.

"Exploring the Layouts", 1999 Software Publishing Corporation, 2 pgs.

"Create Diagrams in Word 2002, Excel 2002, and PowerPoint 2002", http://office.microsoft.com/en-us/assistance/HA010346141033.aspx, 2 pgs.

Roderick Singleton, "OpenOffice.org User Guide for Version 1.1.x", May 7, 2004, ONLINE, XP002348571, retrieved from the Internet: URL:www.openoffice.org>, retrieved Sep. 30, 2005, pp. 253-284.

Anonymous: "Extract of Online-Help for OpenOffice Impress (Stylist)", Ver. 1.1.5, German Version, online, Apr. 2004.

US Office Action dated Jan. 22, 2007, cited in U.S. Appl. No. 11/081,323.

US Office Action dated May 16, 2007 cited in U.S Appl. No. 10/957,103.

US Office Action dated Jun. 29, 2007 cited in U.S. Appl. No. 11/081,324.

US Office Action (Advisory) dated Sep. 18, 2007 cited in U.S. Appl. No. 11/081,323.

US Office Action (Final), dated Oct. 23, 2007 cited in U.S. Appl. No. 10/957,103.

US Office Action dated Oct. 31, 2006 cited in U.S. Appl. No. 11/013,630.

U.S. Appl. No. 11/013,630, Filed Dec. 15, 2004 for "Semantically Applying Formatting to a Presentation Model", Inventors: Gerhard, Lutz; Underhill, Tom; Printing, Gary; Schilling, John; Rockey, Eric S. and Vanderberghe, Keri.

EP Patent Appl. No. 05-108-658.5 Search Report dated Feb. 13, 2006.

U.S. Appl. No. 11/081,324 filed Mar. 15, 2005 entitled "Method and Computer-Readable Medium for Fitting Text to Shapes Within a Graphic".

U.S. Appl. No. 11/081,323 filed Mar. 15, 2005 entitled "Method and Computer-Readable Medium for Generating Graphics Having a Finite Number of Dynamically Sized and Positioned Shapes".

U.S. Appl. No. 10/957,103 filed Sep. 30, 2004 entitled "Editing the Text of an Arbitrary Graphic Via Hierarchical List".

U.S. Office Action Summary dated Jul. 6, 2007, Application No. 11/081,323, Filed: Mar. 15, 2005, entitled "Method and Computer-Readable Medium for Generating Graphics Having a Finite Number of Dynamically Sized and Positioned Shapes," Inventors Ilan Berker, Matthew J. Kotler, Janet L. Schorr, Scott A. Sherman, Thomas C. Underhill, Stephen T. Wells.

* cited by examiner

```
<LayoutNode>
  <Algorithm type="pyramid" />
  <Shapes>
    <Shape ID="trapezoid" />
  </Shapes>
  <Constraints>
    <Constraint type="width" value="1" />
  </Constraints>
  <ForEach axis="children">
    <Algorithm type="bulleted-list" />
    <Constraints>
      <Constraint type="height" value="2" />
    </Constraints>
  </ForEach>
</LayoutNode>
```

*Fig. 4*

METHOD, SYSTEM, AND COMPUTER-READABLE MEDIUM FOR CREATING AND LAYING OUT A GRAPHIC WITHIN AN APPLICATION PROGRAM

CROSS-REFERENCE TO RELATED APPLICATIONS

This patent application is related to and filed concurrently with U.S. patent application Ser. No. 10/957,103, entitled "Editing The Text Of An Arbitrary Graphic Via A Hierarchical List," filed on Sep. 30, 2004 and assigned to the same assignee as this application. The aforementioned patent application is expressly incorporated herein, in its entirety, by reference.

BACKGROUND OF THE INVENTION

Modern software applications, including word processors and dedicated drawing application programs, enable users to create both simple and complex graphics. These drawing programs allow users to create graphics using a variety of shapes which may be annotated with text. The graphics created by these applications may be stand-alone documents or incorporated into text documents. Despite the advantages offered by modern drawing programs, however, these programs suffer from several drawbacks which hinder the creation and layout of graphics by the typical user.

One drawback of modern drawing programs is that although they may offer tools for creating graphics, many users are not aware of these existing tools, or of how to use them effectively. As a result, users either create their own graphics or use the graphics tools incorrectly, resulting in graphics with shapes that are misaligned and text that should be the same font size, but is not. Another drawback of modern drawing programs is that shapes containing text do not automatically resize fonts or expand their dimensions for added or enlarged text such that the text remains fully enclosed in the shape. Yet another drawback of modern drawing programs is that they offer either rigid layouts or no layout at all. Programs with no layout require users to manually size and position every shape; programs with rigid layout do not allow users to make any changes or customizations to the size or position of the shape.

It is with respect to these considerations and others that the various embodiments of the present invention have been made.

BRIEF SUMMARY OF THE INVENTION

In accordance with the present invention, the above and other problems are solved by a method, apparatus, and computer-readable medium for creating and laying out a graphic within a drawing application program based on a set of constraints that transform data and relationships into a specific graphic layout. The method includes receiving a data model defining the data and relationships between that data that will be represented in the graphic, receiving a graphic definition defining the graphic to be created, generating a layout tree by mapping data from the data model to the information in the graphic definition, determining the size and position for the graphic shapes according to the constraint values and constraint rules specified in the graphic definition, and creating a shape list for the graphic using the information from the layout tree. These shapes can then be rendered by any rendering application to achieve a final graphic.

To map the data from the data model to the information in the graphic definition, the method iterates through the data model and applies criteria specified in the graphic definition to determine the algorithms, constraints, constraint rules, and shape properties for each shape needed to construct the graphic. These sets of data are then added to the layout tree, which is a hierarchical representation of the graphic structure.

To determine the size and position of graphic shapes, the method accesses the algorithms, constraints, and constraint rules in the graphic definition. The algorithms come from an unbounded set of potential algorithms that know how to size and position shapes to achieve a specific graphic layout, such as laying out shapes in a circular path or laying out shapes in a linear path. The algorithms use the constraints, or starting values, along with the constraint rules, or instructions for altering those starting values within a range, to determine the size and position of the shapes, based on the number of shapes, amount of text within each shape, and the dimensions of the area in which the shapes are to be laid out.

The invention may be implemented as a computer process, a computing system, or as an article of manufacture such as a computer program product or computer readable media. The computer program product may be a computer storage media readable by a computer system and encoding a computer program of instructions for executing a computer process.

These and various other features, as well as advantages, which characterize the present invention, will be apparent from a reading of the following detailed description and a review of the associated drawings.

BRIEF DESCRIPTION OF THE SEVERAL VIEWS OF THE DRAWINGS

FIG. 4 is a block diagram of a portion of an illustrative graphic definition for generating a layout tree, according to the various embodiments of the invention.

DETAILED DESCRIPTION OF THE INVENTION

Figure 1:
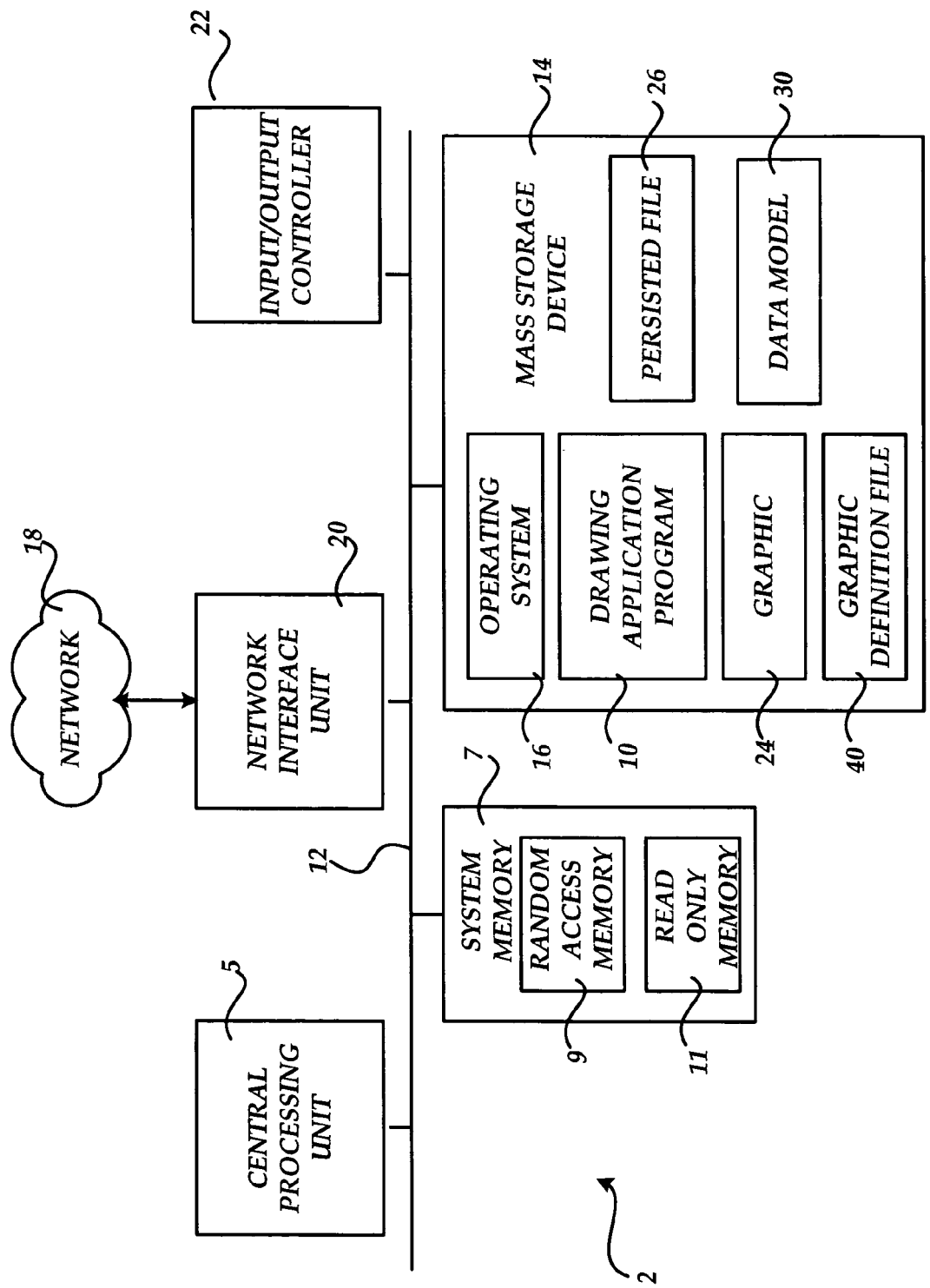
FIG. 1 is a computer system architecture graphic illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVJS'), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

Figure 2:
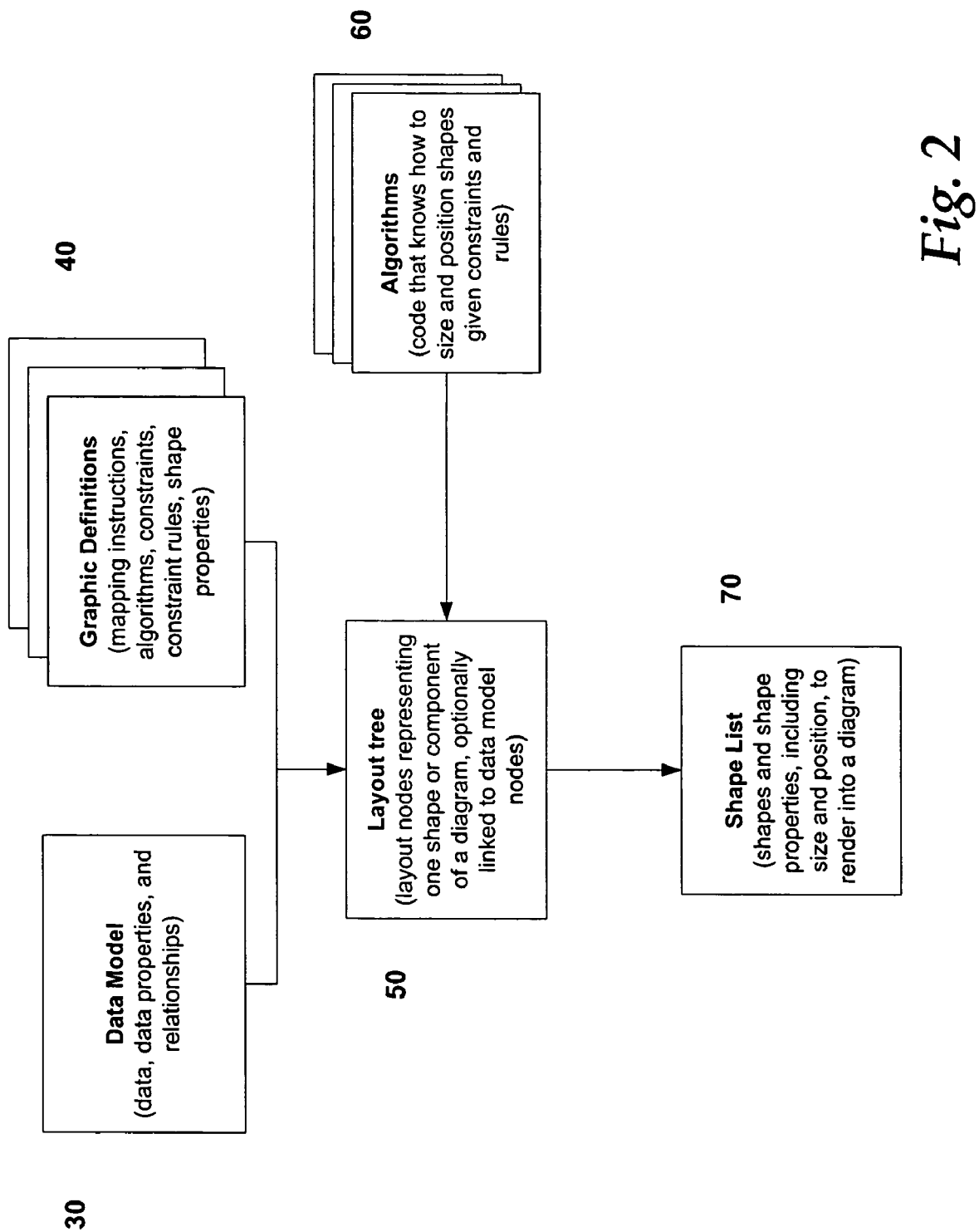
FIG. 2 is a block diagram of the various components which are utilized in the creation and layout of graphics within the drawing application program in the computer system of FIG. 1, according to the various embodiments of the invention.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a drawing application program 10. The drawing application program 10 is operative to provide functionality for the creation and layout of graphics, such as graphic 24. According to one embodiment of the invention, the drawing application program 10 comprises the OFFICE suite of application programs from MICROSOFT CORPORATION including the WORD, EXCEL, and POWERPOINT application programs. Referring now to FIG. 2, a block diagram of the various components which are utilized in the creation and layout of graphics within the drawing application program 10 is shown, according to the various embodiments of the invention. The various components include a data model 30, graphic definition 40, a layout tree 50, algorithms 60, and a shape list 70. In various embodiments of the invention, the drawing application program 10 reads in the graphic definition 40 for instructions regarding the creation and layout of graphics. It will be appreciated that in one embodiment of the invention, the data model 30 and the graphic definition file 40 may be stored as individual files in the computer system 2 which are accessed by the drawing application program 10.

The data model 30 includes a collection of nodes, relationships, text, and properties that contains the content for constructing the graphic 24. The graphic definition 40 is a collection of data which describes how to create a specific graphic layout. In various embodiments of the invention, the graphic definition 40 may be formatted according to extensible markup language ("XML"). As is understood by those skilled in the art, XML is a standard format for communicating data. In the XML data format, a schema is used to provide XML data with a set of grammatical and data type rules governing the types and structure of data that may be communicated. The XML data format is well-known to those skilled in the art, and therefore not discussed in further detail herein. The aspects of a graphic described by the graphic definition 40 include the name of a layout algorithm to use for each layout node, algorithm parameters, constraints, and constraint rules for constructing the layout tree, defaults for shape geometry and style properties, graphic classification data, and a sample data model.

Constraints are conditions used by a layout algorithm for creating a graphic. An example of a constraint is the value to be used for a shape's width. It will be appreciated that constraints may include numeric values or Boolean values. Numeric constraints can specify a specific numeric value (e.g., width=1 inch). Numeric constraints may also calculate their value by referring to other constraint values using references (e.g., height=width*0.75). Boolean constraints may include equality constraints which force all nodes in a set to have the same value for another constraint, and may include inequality constraints, where one constraint value is limited based on another constraint value (e.g. shape's width needs to be less-than or greater-than another shape's height). Constraints may be propagated between layout nodes to enforce equality between drawing elements (e.g., all normal nodes have the same font size) or inequality (e.g., width of transition nodes should be <= normal node width). Constraints may be propagated by attaching a shared propagator to a constraint which propagates its states to other layout nodes. It will be appreciated that both constraints and constraint rules may be updated on the other nodes from the propagating constraint. Constraint rules are a description of how to modify a set of constraints if they are unable to be met by a layout algorithm. For instance, a constraint may specify that a font size must be 14 points, but a constraint rule may specify that a font size can decrease to a minimum of 8 points. The graphic definition 40 will be discussed in greater detail with respect to FIG. 4, below.

The layout tree 34 is a collection of presentation elements, or layout nodes. A layout node is a node in the layout tree representing one shape or group of shapes that forms an element of the graphic 24. A layout node may be optionally linked to the nodes of the data model 30. The layout tree 34 stores data about the shapes that will compose a graphic, including the respective geometries, properties, text fitting, and placement of shapes.

The drawing application program 10 constructs the layout tree by mapping the data from the data model to the graphic layout information in the graphic definition to construct layout nodes, and associating algorithms, constraints and constraint rules with these layout nodes. It then utilizes the algorithm, constraints, and constraint rules to determine shape dimensions, text fitting, and shape placement prior to constructing the shape list 50 which is used to render the graphic 24 on the drawing canvas. Layout nodes will be discussed in greater detail, below. The layout tree 34 will be discussed in greater detail with respect to FIG. 3, below.

Figure 3:
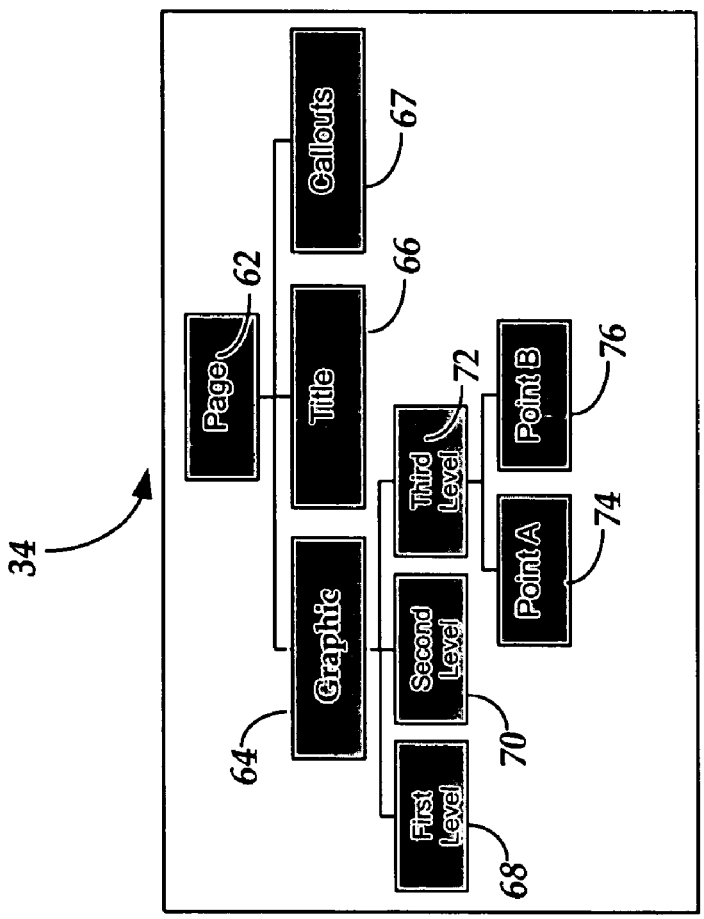
FIG. 3 is a block diagram of an illustrative layout tree, according to the various embodiments of the invention.

Referring now to FIG. 3, a block diagram of one instance of a layout tree 34 is shown, according to the various embodiments of the invention. It should be understood that the layout tree 34 shown in FIG. 3 is illustrative and that layout trees may be larger or smaller depending on the amount of data for the graphic and how the graphic layout is defined. The layout tree 34 includes a hierarchical arrangement of layout nodes to be utilized in laying out the graphic 24. In this instance, the layout nodes represent the overall page area to contain the graphic, page node 62. The children (or second level nodes) of the page node 62 include a graphic node 64, a title node 66, and a callouts node 67. The children of the graphic node 64 include a first level node 68, a second level node 70, and a third level node 72, representing the shapes that construct the diagram, and map back to data model elements. The third level node also has child nodes 74 (Point A) and 76 (Point B), which represent visible shapes and also map back to data model elements.

Referring now to FIG. 4, a block diagram of a portion of the graphic definition 40 is shown, according to the various embodiments of the invention. As shown in FIG. 4, this implementation of the graphic definition is based on an XML schema that defines the layout of the graphic 24. The XML schema includes a LayoutNode tag 47, which has subtags including an Algorithm tag that defines the type of algorithm used to layout the graphic by a layout node (i.e., pyramid), a Shapes tag 48 for defining shapes which may be used in the graphic by a layout node (i.e., trapezoid), and a Constraints tag 49 for defining constraints.

Figure 5:
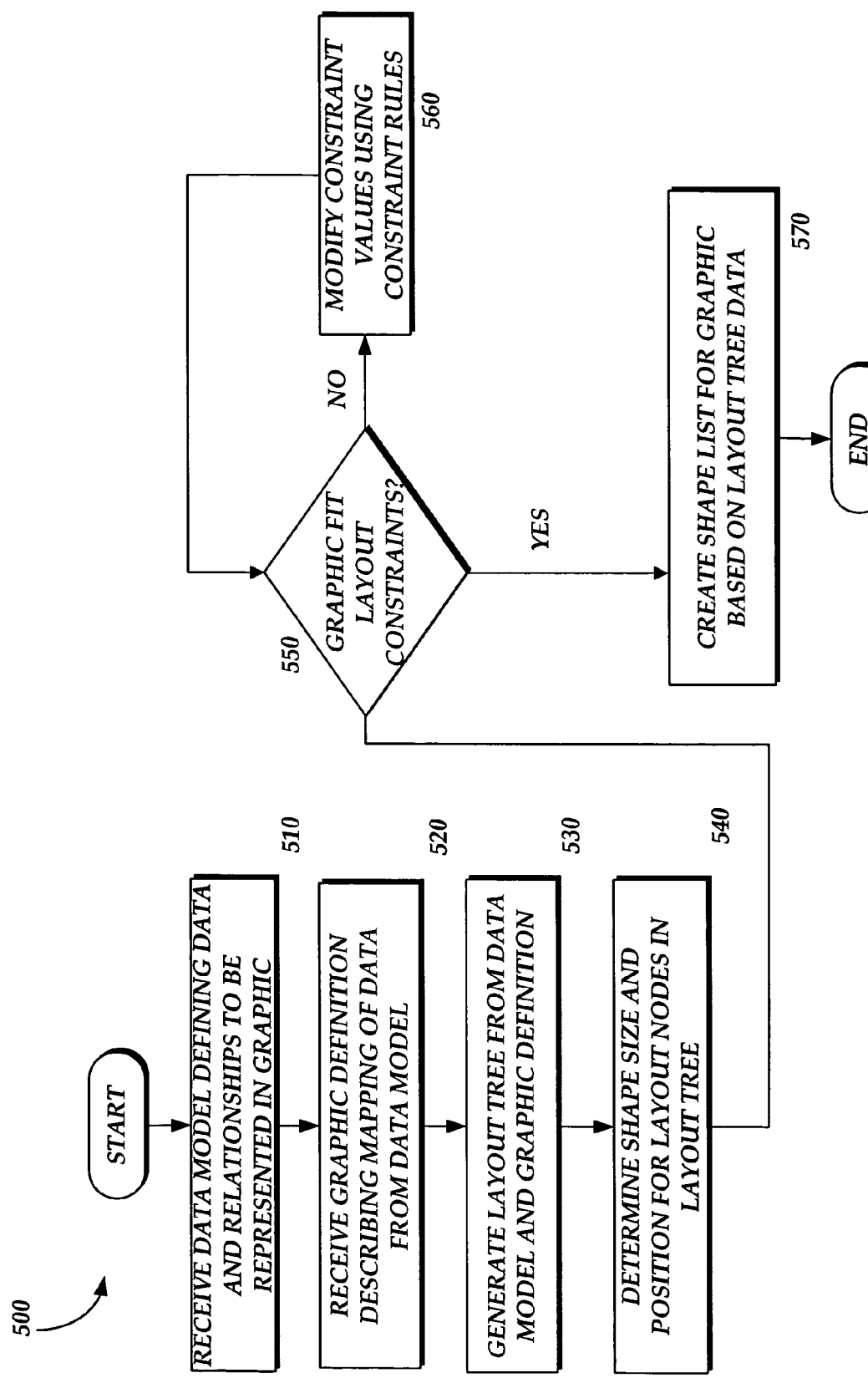
FIG. 5 is an illustrative routine performed by a drawing application program in the computer system of FIG. 1 for creating and laying out a graphic, according to an embodiment of the invention.

Referring now to FIG. 5, an illustrative routine 500 will be described illustrating a process performed by the drawing application program 10 for creating and laying out a graphic. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 5, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

Referring now to FIG. 5, the routine 500 begins at operation 510, where the drawing application program 10 receives a data model defining the data and data relationships to be represented in the graphic to be created. It will be appreciated that the data and the data relationships determine the type and number of each layout node in the layout tree 34 generated by the layout framework, according to the patterns specified in the graphic definition.

The routine 500 continues from operation 510 to operation 520, where the drawing application program 10 receives a graphic definition describing one possibility for the mapping of the data from the data model to layout nodes specifying algorithms, parameters, constraints, constraint rules, and shape properties. It will be appreciated that the graphic definition 40 may be retrieved as a separate file, such as an XML file, stored in the computer system 2. In this manner, support is provided for the development of new graphic definitions which may be added by a user so that they may be read by the drawing application program 10. New graphic definitions can be created and retrieved without changes to the layout framework, allowing for an expanding set of graphics that the drawing application can lay out.

The graphic definition provides patterns for applying the algorithms, parameters, constraints, and constraint rules. As defined herein, algorithms are layout routines for positioning and sizing shapes and text. For instance, one algorithm might lay out shapes on a linear path while another algorithm might lay shapes out in a circular path. It will be appreciated that algorithms may take parameters to determine various placement options. For instance, a linear algorithm has parameters for direction and orientation which may be controlled through various drawing tool commands in the drawing application program 10. For instance, a tool may be provided in the drawing application 10 for altering one of the parameters of the layout algorithm to change the orientation of the graphic (e.g., left-to-right vs. right-to-left) or rotate the graphic. The algorithms also are external to the layout framework and can be added to expand the range of graphics that can be created without changes to the layout framework.

The routine 500 continues from operation 520 to operation 530, where the drawing application program 10 generates a layout tree from the received data model and the received graphic definition. In particular, the drawing application program 10 "walks through" the nodes in the data model 30 and maps the nodes and relationships from the data model to specific shapes and default style properties (e.g., formatting and text properties) according to the graphic definition (which may also be defined by an XML schema). As discussed above with respect to FIG. 2, the layout tree 34 includes data about the shapes that will compose a graphic, including the respective geometries, properties, text fitting, and placement of shapes. It will be appreciated that the layout tree is created by iterating through the data model 30 and creating layout nodes based on patterns defined in the graphic definition. Iterators provide instructions for constructing the layout tree by indicating how elements in the data model are read and matched to layout node patterns.

The routine 500 continues from operation 530 to operation 540, where the drawing application program 10 determines the shape size and position for the layout nodes in the layout tree, utilizing the algorithms, parameters, constraints, and constraint rules from the graphic definition. The routine 500 continues from operation 540 to operation 550, where the drawing application program 10 determines if the graphic to be rendered fits a layout space on the drawing canvas based on the constraint values.

If, at operation 550, the graphic to be rendered does not fit the layout space on the drawing canvas, the routine 500 continues to operation 560, where the drawing application program 10 modifies the constraint values using the constraint rules to fit the graphic into the layout space. In particular, the layout nodes in the layout tree 34 may include an ordered set of constraint rules which the drawing application program 10 may utilize to change the constraint values in an attempt to layout the graphic successfully within the layout space. According to various embodiments of the invention, the drawing application program 10 tries each rule in succession, moving on to the next rule only if the current rule does not allow the graphic to fit within the layout space. It will be appreciated that once the application program 10 has finished running through the rules list, it will automatically access a fallback rule list which forces the drawing elements to fit within the layout space on the drawing canvas by shrinking shapes and font size to a very small size, truncating text, or not placing shapes in the layout space.

It should be understood that the aforementioned graphic elements include shapes as well as text which fits inside shapes. Thus, the drawing application program 10 may also determine at operation 550 whether any of the text does not fit within the shapes in the layout space on the drawing canvas. It will be appreciated that text constraint rules as well as other rules may also be included in a layout node's constraint rule list to determine the order in which various techniques are applied to fit the text. These techniques may include growing the size of the shape or altering the text fit constraints (e.g., adjusting margins and font size). Text algorithms are associated with layout nodes of a layout tree where data exists in the data model. Other rules may include algorithms for determining the amount of space between two graphic elements. It will further be appreciated that other rules may utilize algorithms for determining the amount of space between two graphic elements, the relative position of graphic elements, etc.

If, at operation 550, the graphic to be rendered does fit the layout space on the drawing canvas, the routine 500 branches to operation 570, where the drawing application program 10 creates a shape list for the graphic to be created based on the layout tree data determined in operation 540. Once the nodes from the data model 30 and the relationships to specific shapes or shape properties are mapped, the shape list may be rendered on a drawing canvas. The routine 500 then ends.

Based on the foregoing, it should be appreciated that the various embodiments of the invention include a method and apparatus and computer-readable medium for managing specific types of content in an electronic document. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for creating and laying out a graphic within an application program, comprising:
    receiving a data model for constructing the graphic, the data model defining a set of data and data relationships to be represented in the graphic;
    receiving a graphic definition, the graphic definition describing the mapping of the data from the data model to layout nodes, algorithms, parameters, constraints, constraint rules, and shape properties, wherein the graphic definition also specifies iterators for mapping elements in the data model to the layout nodes and sets of algorithms, parameters, constraints, and constraint rules associated with the layout nodes;
    determining shape size and position for shapes in the graphic utilizing the algorithms, parameters, constraints, constraint rules, and shape properties associated with the layout nodes;
    creating a shape list of shapes and shape properties for the graphic based on the algorithms, parameters, constraints, constraint rules, and shape properties associated with the layout nodes; and
    providing the shapes and the shape properties of the shape list to the application program to be rendered as part of the graphic.

2. The method of claim 1, further comprising specifying a plurality of external graphic definitions, wherein each of a plurality of external graphic definitions specify information required to generate a specific graphic, the information including additional mapping conditions, algorithms, parameters, constraints, constraint rules, and shape properties.

3. The method of claim 1, further comprising specifying a plurality of external algorithms, wherein each of the plurality of external algorithms specifies the laying out of the shapes to achieve a specific graphic structure and wherein each of the external algorithms are referenced by a graphic definition.

4. The method of claim 1, wherein the shape size and position for the shape in the graphic are defined by the algorithms in the set of algorithms utilizing the constraints and constraint rules in the corresponding layout nodes.

5. The method of claim 1, wherein the constraints comprise numeric constraints for specifying values for use by the algorithms and wherein the numeric constraint comprises a specific value.

6. The method of claim 5, wherein the numeric constraint is derived by a reference to other constraint values.

7. The method of claim 1, wherein the constraint values are modified according to a set of constraint rules to size and position the layout nodes.

8. The method of claim 1, wherein the constraints comprise Boolean constraints for specifying the equality and inequality of values across shapes and wherein the values of a numeric constraint are propagated to shapes specified by the Boolean constraints.

9. The method of claim 1, wherein multiple layout nodes communicate constraint values to each other to enable the sizing and positioning of the layout nodes using the constraints.

10. The method of claim 1, wherein the graphic definition is written in a markup language.

11. The method of claim 10, wherein the markup language is an extensible markup language (XML).

12. A system for creating and laying out a graphic within a drawing application program, comprising:
    a client computer operative to execute program code for
        receiving a data model, the data model defining a set of data and data relationships to be represented in the graphic;
        receiving a graphic definition for constructing the graphic, the graphic definition describing the mapping of the data from the data model to layout nodes, algorithms, parameters, constraints, constraint rules, and shape properties, wherein the graphic definition also specifies iterators for mapping elements in the data model to the layout nodes and sets of algorithms, parameters, constraints, and constraint rules associated with the layout nodes;
        determining shape size and position for shapes in the graphic utilizing the algorithms, parameters, constraints, constraint rules, and shape properties associated with the layout nodes;

creating a shape list of shapes and shape properties for the graphic based on the algorithms, parameters, constraints, constraint rules, and shape properties associated with the layout nodes; and providing the shapes and the shape properties of the shape list to the drawing application program to be rendered as part of the graphic.

13. The system of claim 12, wherein the program code is further operative for specifying a plurality of external graphic definitions, wherein each of a plurality of external graphic definitions specify information required to generate a specific graphic, the information including additional mapping conditions, algorithms, parameters, constraints, constraint rules, and shape properties.

14. The system of claim 12, wherein the program code is further operative for specifying a plurality of external algorithms, wherein each of the plurality of external algorithms specifies the laying out of the shapes to achieve a specific graphic structure and wherein each of the external algorithms are referenced by a graphic definition.

15. The system of claim 12, wherein the shape size and position for the shapes in the graphic are defined by the algorithms in the set of algorithms utilizing the constraints and constraint rules in the corresponding layout nodes.

16. The system of claim 12, wherein the constraints comprise numeric constraints for specifying values for use by the algorithms and wherein the numeric constraint comprises a specific value.

17. The system of claim 16, wherein the numeric constraint is derived by a reference to other constraint values.

18. The system of claim 12, wherein the constraint values are modified according to the constraint rules to size and position the layout nodes.

19. The system of claim 12, wherein multiple layout nodes communicate constraint values to each other to enable the sizing and positioning of the layout nodes using the constraints.

20. The system of claim 12, wherein the graphic definition is written in a markup language.

21. The system of claim 20, wherein the markup language is an extensible markup language (XML).

22. A computer-readable medium having computer-executable instructions stored thereon which, when executed by a computer, will cause the computer to perform a method for creating and laying out a graphic within an application program, the method comprising:

receiving a data model, the data model defining a set of data and data relationships to be represented in the graphic;

receiving a graphic definition for constructing the graphic, the graphic definition describing the mapping of the data from the data model to layout nodes, algorithms, parameters, constraints, constraint rules, and shape properties, wherein the graphic definition also specifies iterators for mapping elements in the data model to the layout nodes and sets of algorithms, parameters, constraints, and constraint rules associated with the layout nodes;

determining shape size and position for shapes in the graphic utilizing the algorithms, parameters, constraints, constraint rules, and shape properties associated with the layout nodes;

creating a shape list of shapes and shape properties for the graphic based on the algorithms, parameters, constraints, constraint rules, and shape properties associated with the layout nodes; and providing the shapes and the shape properties of the shape list to the application program to be rendered as part of the graphic.

23. The system of claim 12, wherein the constraints comprise Boolean constraints for specifying the equality and inequality of values across shapes and wherein the values of a numeric constraint are propagated to shapes specified by the Boolean constraints.

24. The computer-readable medium of claim 22, further comprising specifying a plurality of external graphic definitions, wherein each of a plurality of external graphic definitions specify information required to generate a specific graphic, the information including additional mapping conditions, algorithms, parameters, constraints, constraint rules, and shape properties.

25. The computer-readable medium of claim 22, further comprising specifying a plurality of external algorithms, wherein each of the plurality of external algorithms specifies the laying out of the shapes to achieve a specific graphic structure and wherein each of the external algorithms are referenced by a graphic definition.

26. The computer-readable medium of claim 22, wherein the shape size and position for the shapes in the graphic are defined by the algorithms in the set of algorithms utilizing the constraints and constraint rules in the corresponding layout nodes.

27. The computer-readable medium of claim 22, wherein the constraints comprise numeric constraints for specifying values for use by the algorithms and wherein the numeric constraint comprises a specific value.

28. The computer-readable medium of claim 27, wherein the numeric constraint is derived by a reference to other constraint values.

29. The computer-readable medium of claim 22, wherein the constraint values are modified according to a set of constraint rules to size and position the layout nodes.

30. The computer-readable medium of claim 22, wherein the constraints comprise Boolean constraints for specifying the equality and inequality of values across shapes and wherein the values of a numeric constraint are propagated to shapes specified by the Boolean constraints.

31. The computer-readable medium of claim 22, wherein multiple layout nodes communicate constraint values to each other to enable the sizing and positioning of the layout nodes using the constraints.

32. The computer-readable medium of claim 22, wherein the graphic definition is written in a markup language.

33. The computer-readable medium of claim 32, wherein the markup language is an extensible markup language (XML).

* * * * *